(12) United States Patent
Chen et al.

(10) Patent No.: US 8,681,125 B2
(45) Date of Patent: Mar. 25, 2014

(54) METHOD AND SYSTEM FOR ESTIMATING THE TENDENCY OF PRESSURE CHANGE ON A TOUCH PANEL

(75) Inventors: Yu-Yen Chen, New Taipei (TW); Ruey-Jiann Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 117 days.

(21) Appl. No.: 13/471,035

(22) Filed: May 14, 2012

(65) Prior Publication Data
US 2013/0038576 A1 Feb. 14, 2013

(30) Foreign Application Priority Data

Aug. 9, 2011 (TW) ............................. 100128393 A

(51) Int. Cl.
*G06F 3/042* (2006.01)
*G09G 5/08* (2006.01)

(52) U.S. Cl.
USPC .......................................... 345/175; 345/166

(58) Field of Classification Search
USPC ................... 345/166, 173, 174, 419
See application file for complete search history.

(56) References Cited

U.S. PATENT DOCUMENTS

2011/0037699 A1* 2/2011 Kim ............................. 345/166
2012/0096376 A1* 4/2012 Hibi ............................. 715/765

* cited by examiner

*Primary Examiner* — Michael Faragalla
(74) *Attorney, Agent, or Firm* — Muncy, Geissler, Olds & Lowe, P.C.

(57) ABSTRACT

A method and a system for estimating the tendency of pressure change on a touch panel are disclosed. The method includes: getting first left-image data and first right-image data by using a left image-capturing device and a right image-capturing device at a first time, respectively; calculating first estimation pressed-area parameter according to the first left-image data and the first right-image data; getting second left-image data and second right-image data by using the left image-capturing device and the right image-capturing device at a second time, respectively; calculating second estimation pressed-area parameter according to the second left-image data and the second right-image data; and compare the first estimation pressed-area parameter with the second estimation pressed-area parameter.

14 Claims, 5 Drawing Sheets

METHOD AND SYSTEM FOR ESTIMATING THE TENDENCY OF PRESSURE CHANGE ON A TOUCH PANEL

BACKGROUND OF THE INVENTION

1. Field of the Invention

The present invention relates to a method for estimating the tendency of pressure change; more particularly, the present invention relates to a method for estimating the tendency of pressure change on a touch panel.

2. Description of the Related Art

With the high-speed development of technology, more and more touch control products enter our lives. Generally speaking, smart phones, digital cameras, computers and televisions sold in the market today are appealed to be equipped with touch control function as one of their features. However, when a user touches a screen, the user would always expect a specific physical reaction generated after the screen is touched, such as screen depression at the time the screen is being pressed.

In order to solve the abovementioned problem, in known prior arts, visual or audio effects are utilized as assistance. For example, at the time the screen is being pressed, a visual effect of screen depression is displayed, or an audio effect of a keyboard sound effect is generated, such that the user can experience the interaction with the screen.

However, touch control belongs to a touch action, therefore the best way for interaction is to generate different feedback effects according different pressure force levels, so as to directly satisfy the user's expectation through "haptics", such that the user can directly feel it when manipulating the system or product. The key point of providing the haptic effect is to identify the pressure that the user applies on the touch screen. If the pressure increases, the haptic effect increases accordingly; if the pressure decreases, the haptic effect decreases accordingly.

In known prior arts, generally an additional pressure sensor is used for sensing the tendency of pressure change. However, the cost would increase because of adding the pressure sensor. Therefore, there is a need to provide a method and system for estimating the tendency of pressure change on a touch panel to mitigate and/or obviate the aforementioned problems.

SUMMARY OF THE INVENTION

It is an object of the present invention to provide a method for estimating the tendency of pressure change on a touch panel.

To achieve the abovementioned object, the method for estimating the tendency of pressure change on a touch panel of the present invention is used in an optically-detected input image system. The optically-detected input image system comprises a left image-capturing device and a right image-capturing device for detecting a position touched on an image screen by a user. The method for estimating the tendency of pressure change on a touch panel comprises the following steps: at a first time, obtaining first left image data by using the left image-capturing device, and obtaining first right image data by using the right image-capturing device; calculating a first estimated pressed-area parameter according to the first left image data and the first right image data; at a second time, obtaining second left image data by using the left image-capturing device, and obtaining second right image data by using the right image-capturing device; calculating a second estimated pressed-area parameter according to the second left image data and the second right image data; and comparing the first estimated pressed-area parameter with the second estimated pressed-area parameter. According to the abovementioned steps, if the second estimated pressed-area parameter is greater than the first estimated pressed-area parameter, the method determines the user increases a touch pressure on the image screen from the first time to the second time. If the second estimated pressed-area parameter is less than the first estimated pressed-area parameter, the method determines the user decreases the touch pressure on the image screen from the first time to the second time.

It is another object of the present invention to provide a system for estimating the tendency of pressure change on a touch panel, so as to determine the change of a touch pressure applied on an image screen by a user.

To achieve the abovementioned object, the system for estimating the tendency of pressure change on a touch panel of the present invention comprises a left image-capturing device, a right image-capturing device and a processor. The left image-capturing device is used for obtaining first left image data at a first time, and for obtaining second left image data at a second time. The right image-capturing device is used for obtaining first right image data at the first time, and for obtaining second right image data at the second time. The processor is used for: calculating a first estimated pressed-area parameter according to the first left image data and the first right image data; calculating a second estimated pressed-area parameter according to the second left image data and the second right image data; and comparing the first estimated pressed-area parameter with the second estimated pressed-area parameter for performing one of the following mechanisms: if the second estimated pressed-area parameter is greater than the first estimated pressed-area parameter, the system determines the user increases the touch pressure on the image screen from the first time to the second time; and if the second estimated pressed-area parameter is less than the first estimated pressed-area parameter, the system determines the user decreases the touch pressure on the image screen from the first time to the second time.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
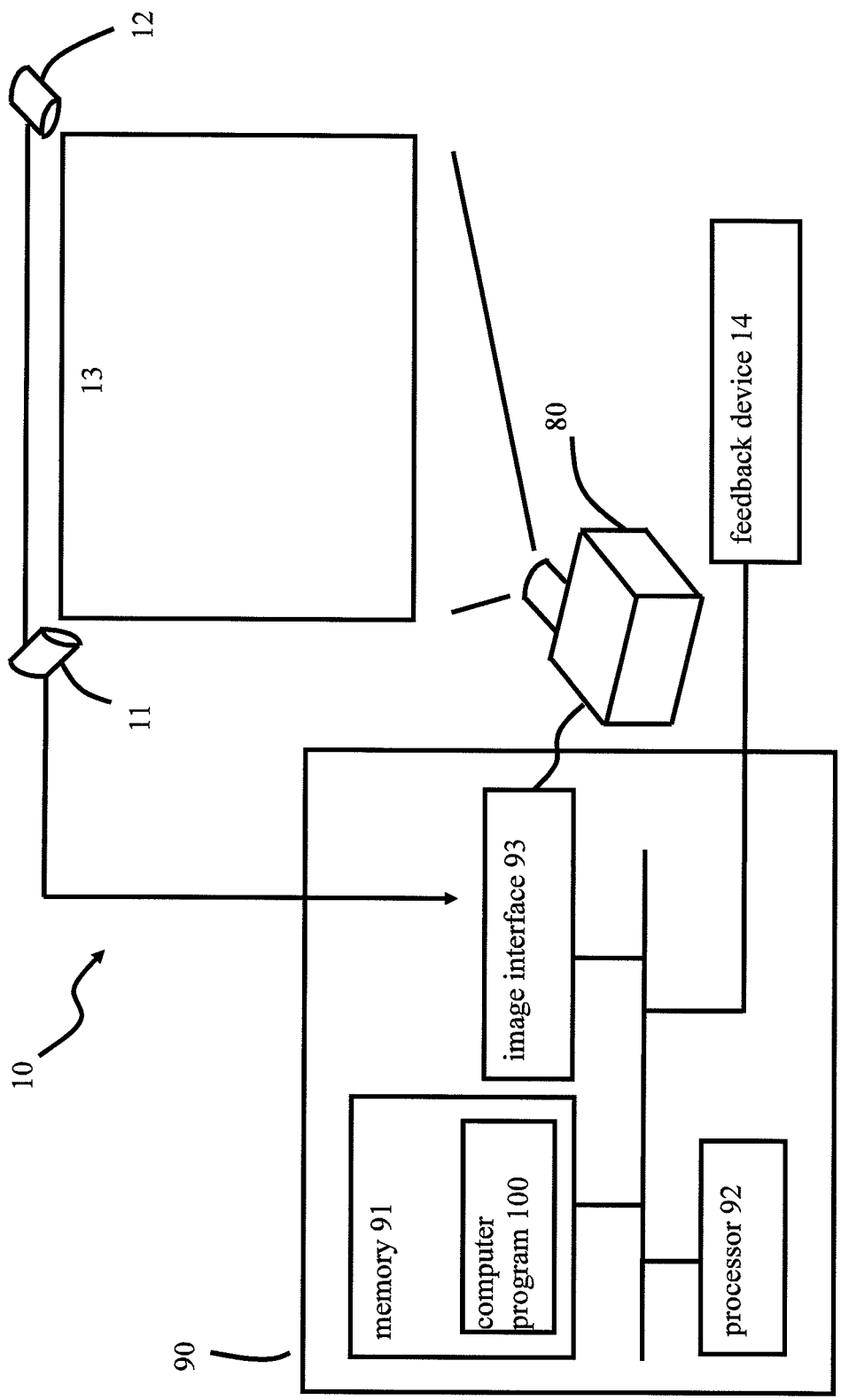
FIG. 1 illustrates an application diagram of a method for estimating the tendency of pressure change on a touch panel according to the present invention.

Please refer to FIG. 1, which illustrates an application diagram of a method for estimating the tendency of pressure change on a touch panel according to the present invention. As shown in FIG. 1, in one embodiment of the present invention, an optically-detected input image system 10 comprises a computer 90, a projector 80, a left image-capturing device 11, a right image-capturing device 12, an image screen 13 and a feedback device 14. The computer 90 comprises a memory 91, a processor 92 and an image interface 93, wherein the memory 91 is stored with a computer program 100.

The projector 80 is connected to the image interface 93 of the computer 90, so as to project an image onto the image screen 13 (which is, in this embodiment, a common projection screen as seen in an ordinary meeting room), such that the left image-capturing device 11 and the right image-capturing device 12 (such as CCD/CMOS cameras) respectively installed on the upper-left corner and the upper-right corner of the image screen 13 can detect a position touched on the image screen 13 by a user.

The computer 90 can utilize the processor 92 to execute the computer program 100 stored in the memory 91 to implement the method for estimating the tendency of pressure change on a touch panel of the present invention, so as to estimate the tendency of pressure change on the image screen 13, and finally to provide a feedback signal according to the pressure change to the feedback device 14 (which is a speaker in this embodiment) or the image screen 13.

Please note that the method for estimating the tendency of pressure change on a touch panel of the present invention is not limited to be implemented in the abovementioned environment. For example, the optically-detected input image system 10 does not necessarily need the projector 80, the image screen 13 is a general display monitor (such as a LCD monitor), the image screen 13 is directly connected to the image interface 93 of the computer 90, and the left image-capturing device 11 and the right image-capturing device 12 are similarly installed on two upper sides of the LCD monitor.

Figure 2:
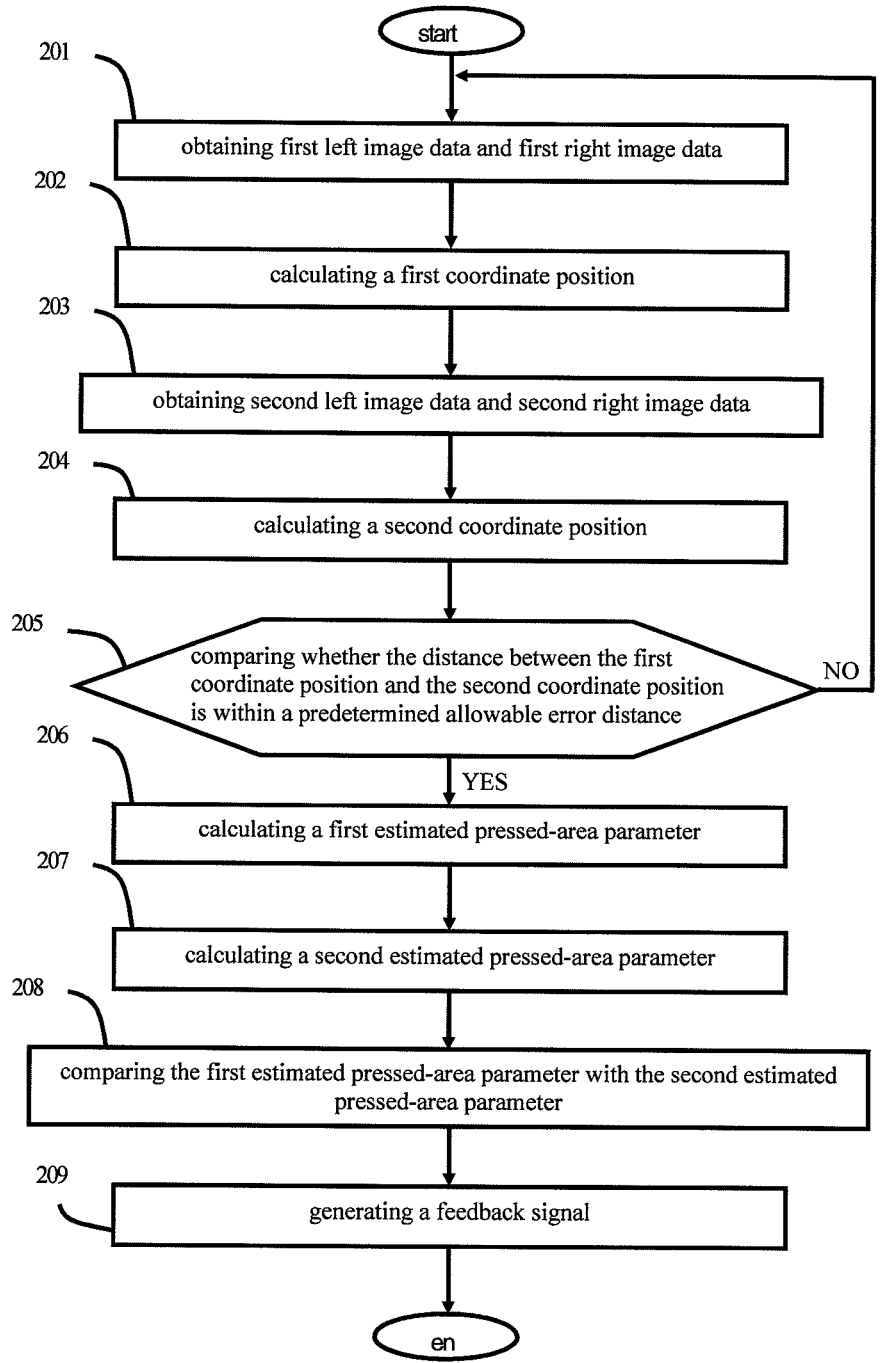
FIG. 2 illustrates a flowchart of the method for estimating the tendency of pressure change on a touch panel according to the present invention.

Then, please refer to FIG. 2, which illustrates a flowchart of the method for estimating the tendency of pressure change on a touch panel according to the present invention. And please also refer to FIG. 1 as well as FIGS. 3-5.

First, the method performs step 201: obtaining first left image data and first right image data.

Figure 3:
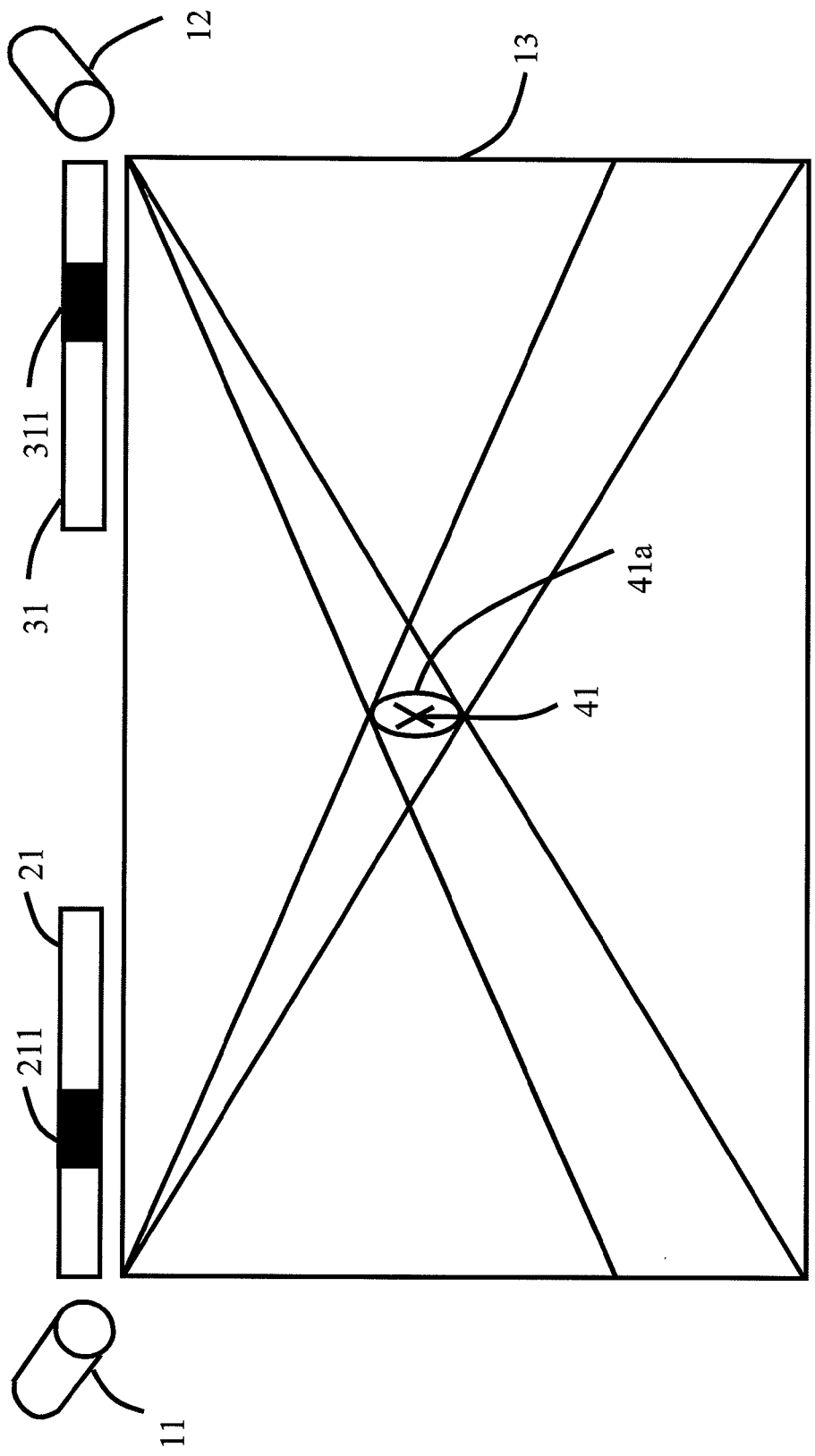
FIG. 3 illustrates a schematic drawing of obtaining first left image data and first right image data according to one embodiment of the present invention.

Please refer to FIG. 3, which illustrates a schematic drawing of obtaining first left image data and first right image data according to one embodiment of the present invention. At a first time, the user's finger 41a at or close to a first coordinate position 41 is pressed on the image screen 13. The optically-detected input image system 10 can utilize the left image-capturing device 11 and the right image-capturing 12 to obtain the first left image data 21 and the first right image data 31. Because the finger 41s shades partial area of the image screen 13, the first left image data 21 includes a first left shaded area 211, and the first right image data 31 includes a first right shaded area 311. The mechanisms of utilizing both image-capturing devices 11 and 12 to obtain both image data 21 and 31, and wherein the image data 21 and 31 respectively include shaded areas 211 and 311 due to the finger 41a are known techniques; therefore, there is no need for further description.

Then, the method performs step 202: calculating a first coordinate position.

After the method obtains the first left image data 21 and the first right image data 31, the first left image data 21 and the first right image data 31 would be transmitted to the computer 90, such that the computer 90 can execute the computer program 100 to calculate the first coordinate position 41 at where the finger 41a is located according to the shaded areas 211 and 311. For example, the first coordinate position 41 can be accurately calculated by, but not limited to, utilizing triangulation. Because triangulation is a known technique, there is no need for further description.

Next, the method performs step 203: obtaining second left image data and second right image data.

Figure 4:
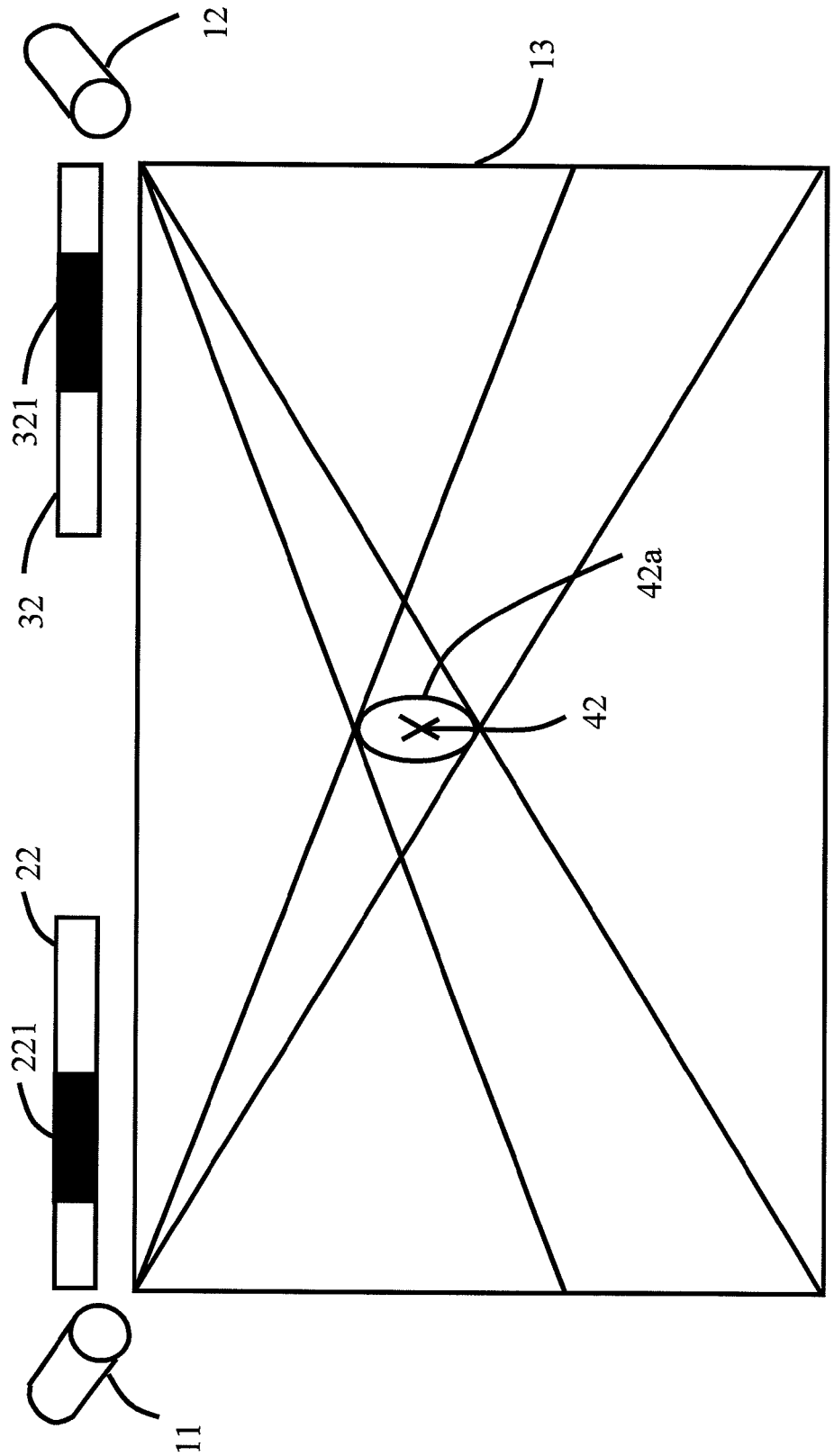
FIG. 4 illustrates a schematic drawing of obtaining second left image data and second right image data according to one embodiment of the present invention.
Figure 5:
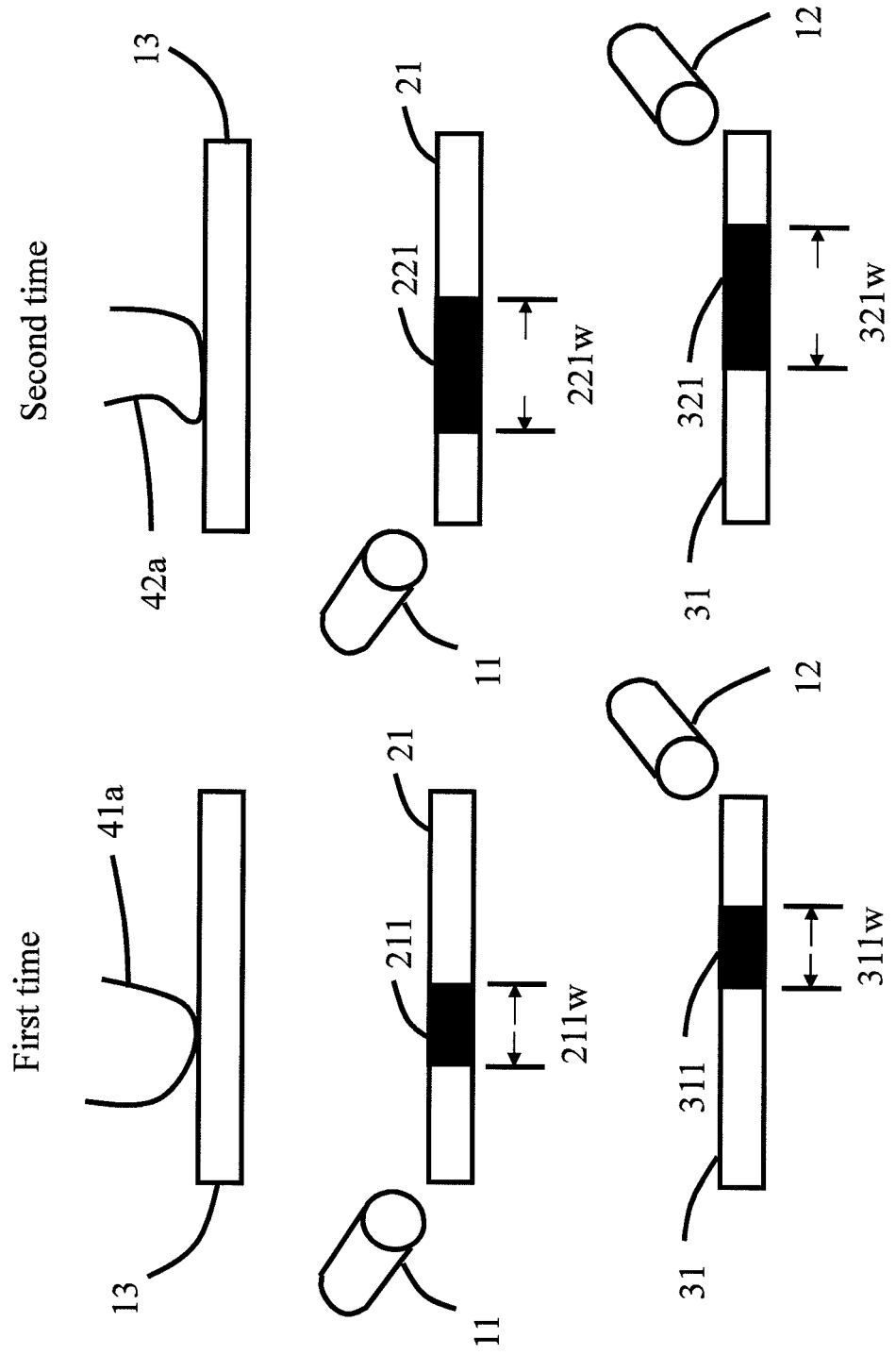
FIG. 5 illustrates a schematic drawing of shaded area widths according to one embodiment of the present invention.

Please refer to FIG. 4, which illustrates a schematic drawing of obtaining second left image data and second right image data according to one embodiment of the present invention. At a second time, the user's finger 42a at or close to a second coordinate position 42 is pressed on the image screen 13. Similarly, the optically-detected input image system 10 can utilize the left image-capturing device 11 and the right image-capturing device 12 to obtain the second left image data 22 and the second right image data 32, wherein the second left image data 22 includes a second left shaded area 221, and the second right image data 32 includes a second right shaded area 321.

Please note that the two image-capturing devices 11 and 12 are in fact constantly transmitting the left and right image data to the computer 90, and the computer 90 is constantly calculating whether there is an object touching the screen and its coordinate position. For example, the computer 90 performs a calculation every 0.1 second, which is the time difference between the first time and the second time in this embodiment. Generally speaking, a calculation can be performed within 0.01 second to 1 second; therefore the time difference between the first time and the second time can be set, but not limited to, between 0.01 second and 1 second.

Then, the method performs step 204: calculating a second coordinate position.

After the method obtains the second left image data 22 and the second right image data 32, the second left image data 22 and the second right image data 32 would be transmitted to the computer 90, such that the computer 90 can execute the computer program 100 to calculate the second coordinate position 42.

Then, the method performs step 205: comparing whether the distance between the first coordinate position and the second coordinate position is within a predetermined allowable error distance.

After the method calculates the first coordinate position 41 and the second coordinate position 42, the computer 90 executes the computer program 100 to compare whether the distance between the above two positions is within a predetermined allowable error distance. If yes, the method then performs step 206. The predetermined allowable error distance is preferably set as 0~15 pixels. In this embodiment, the predetermined allowable error distance is set as 8 pixels.

In this embodiment, the distance difference between the two coordinate positions 41 and 42 is 5 pixels, which is within the predetermined allowable error distance, therefore the method would continue to perform step 206. Please note that the technique of calculating the distance difference between the first coordinate position 41 and the second coordinate position 42 is a known technique, therefore there is no need for further description.

The purpose of step 205 is to detect whether the finger 41a at the first time and the finger 42a at the second time touch the same position or approximate positions on the image screen 13. If yes, the method would further estimate the pressure change between the touch pressure applied on the image screen 13 by the finger 41a at the first time and the touch pressure applied on the image screen 13 by the finger 42a at the second time.

If the distance between the finger 41a at the first time and the finger 42a at the second time is beyond the predetermined allowable error distance, it means the finger moves quite a distance. At this time, the method does not estimate the pressure change between the touch pressure applied on the image screen 13 by the finger 41a at the first time and the touch pressure applied on the image screen 13 by the finger 42a at the second time, and the method then returns to step 201.

Next, the method performs step 206: calculating a first estimated pressed-area parameter.

After the method confirms that the distance difference is within the predetermined allowable error distance, the method can then calculate the image area, and determine the tendency of pressure change according to the change of the image area. Please refer to FIG. 5, the first left image data 21 and the first right image data 31 obtained at the first time respectively include the first left shaded area 211 and the first right shaded area 311, wherein the first left shaded area 211 includes a first left shaded area width 211w, and the first right shaded area 311 includes a first right shaded area width 311w. In this embodiment, the first estimated pressed-area parameter is estimated by, but not limited to, multiplying the first left shaded area width 211w and the first right shaded area width 311w. For example, the first left shaded area width 211w and the first right shaded area width 311w can also be put into other mathematic formulas for calculating the first estimated pressed-area parameter. In this embodiment, the first left shaded area width 211w is 30 pixels, and the first right shaded area width 311w is 25 pixels, therefore the first estimated pressed-area parameter is 750 pixels.

Then, the method performs step 207: calculating a second estimated pressed-area parameter.

Similarly, the second left image data 22 and the second right image data 32 obtained at the second time respectively include the second left shaded area 221 and the second right shaded area 321, wherein the second left shaded area 221 includes a second left shaded area width 221w, and the second right shaded area 321 includes a second right shaded area width 321w. In this embodiment, the second left shaded area width 221w is 50 pixels, and the second right shaded area width 321w is 47 pixels, therefore the second estimated pressed-area parameter is 2350 pixels.

Then, the method performs step 208: comparing the first estimated pressed-area parameter with the second estimated pressed-area parameter.

After the method calculates the first estimated pressed-area parameter and the second estimated pressed-area parameter, the method then compares the values of both parameters. If the second estimated pressed-area parameter is greater than the first estimated pressed-area parameter, the method determines the user increases the touch pressure on the image screen 13 from the first time to the second time. If the second estimated pressed-area parameter is less than the first estimated pressed-area parameter, the method determines the user decreases the touch pressure on the image screen 13 from the first time to the second time. In this embodiment, the second estimated pressed-area parameter is greater than the first estimated pressed-area parameter; therefore, the method determines the user increases the touch pressure on the image screen 13 from the first time to the second time.

Finally, the method performs step 209: generating a feedback signal.

After the method estimates the change of the touch pressure applied on the image screen 13 by the user, the computer 90 can utilize the processor 92 to execute the computer program 100, so as to generate the feedback signal for being transmitted to the feedback device 14 or the image screen 13 as a response, wherein the feedback signal can be a visual, audio or haptic feedback signal. In this embodiment, the feedback device 14 can be a speaker, and because the touch pressure increases from the first time to the second time, the computer program 100 would generate an audio feedback signal to drive the speaker to generate a louder sound; or, the method can generate a haptic feedback signal for being transmitted to the image screen 13, such that the image screen 13 would increase a vibration level (wherein the feedback device is installed behind the screen); moreover, the method can generate a visual feedback signal, for example, when the user presses a worm of a game software application program, the worm displayed on the image screen 13 would generate different shapes or expressions due to different touch pressures; of course, different sounds can be generated as well.

Please note that the method for estimating the tendency of pressure change on a touch panel of the present invention is not limited to the abovementioned specific order of execution, it is understood that the order of execution may differ from the above description as long as the object of the present invention can be accomplished.

Although the present invention has been explained in relation to its preferred embodiments, it is to be understood that many other possible modifications and variations can be made without departing from the spirit and scope of the invention as hereinafter claimed.

What is claimed is:

1. A method for estimating the tendency of pressure change on a touch panel, used in an optically-detected input image system, the optically-detected input image system comprises a left image-capturing device and a right image-capturing device for detecting a position touched on an image screen by a user, the method comprising:

at a first time, obtaining first left image data by using the left image-capturing device, and obtaining first right image data by using the right image-capturing device;

calculating a first estimated pressed-area parameter according to the first left image data and the first right image data;

at a second time, obtaining second left image data by using the left image-capturing device, and obtaining second right image data by using the right image-capturing device;

calculating a second estimated pressed-area parameter according to the second left image data and the second right image data; and comparing the first estimated pressed-area parameter with the second estimated pressed-area parameter for performing one of the following steps:

if the second estimated pressed-area parameter is greater than the first estimated pressed-area parameter, determining the user increases a touch pressure on the image screen from the first time to the second time; and if the second estimated pressed-area parameter is less than the first estimated pressed-area parameter, determining the user decreases the touch pressure on the image screen from the first time to the second time.

2. The method for estimating the tendency of pressure change on a touch panel as claimed in claim 1, wherein the first left image data includes a first left shaded area, the first right image data includes a first right shaded area, and the first estimated pressed-area parameter is calculated according to the first left shaded area and the first right shaded area; the second left image data includes a second left shaded area, the second right image data includes a second right shaded area, and the second estimated pressed-area parameter is calculated according to the second left shaded area and the second right shaded area.

3. The method for estimating the tendency of pressure change on a touch panel as claimed in claim 2, wherein:
the first left shaded area includes a first left shaded area width;
the first right shaded area includes a first right shaded area width;
the second left shaded area includes a second left shaded area width;
the second right shaded area includes a second right shaded area width;
the first estimated pressed-area parameter is calculated by multiplying the first left shaded area width and the first right shaded area width; and
the second estimated pressed-area parameter is calculated by multiplying the second left shaded area width and the second right shaded area width.

4. The method for estimating the tendency of pressure change on a touch panel as claimed in claim 3, wherein the time difference between the first time and the second time is between 0.01 second and 1 second.

5. The method for estimating the tendency of pressure change on a touch panel as claimed in claim 4, wherein the method further comprises:
calculating a first coordinate position according to the first left image data and the first right image data; and
calculating a second coordinate position according to the second left image data and the second right image data.

6. The method for estimating the tendency of pressure change on a touch panel as claimed in claim 5, wherein the method further comprises:
comparing whether the distance between the first coordinate position and the second coordinate position is within a predetermined allowable error distance, if yes, performing steps of calculating the first estimated pressed-area parameter and calculating the second estimated pressed-area parameter.

7. The method for estimating the tendency of pressure change on a touch panel as claimed in claim 6, wherein the predetermined allowable error distance is 0~15 pixels of the image screen.

8. The method for estimating the tendency of pressure change on a touch panel as claimed in claim 7, wherein after comparing the first estimated pressed-area parameter with the second estimated pressed-area parameter, the method further comprises generating a feedback signal according to the comparison result.

9. The method for estimating the tendency of pressure change on a touch panel as claimed in claim 1, wherein after comparing the first estimated pressed-area parameter with the second estimated pressed-area parameter, the method further comprises generating a feedback signal according to the comparison result.

10. The method for estimating the tendency of pressure change on a touch panel as claimed in claim 9, wherein the time difference between the first time and the second time is between 0.01 second and 1 second.

11. A system for estimating the tendency of pressure change on a touch panel, used for determining the change of a touch pressure applied on an image screen by a user, the system for estimating the tendency of pressure change on a touch panel comprising:
a left image-capturing device, used for obtaining first left image data at a first time, and obtaining second left image data at a second time;
a right image-capturing device, used for obtaining first right image data at the first time, and obtaining second right image data at the second time; and
a processor, used for calculating a first estimated pressed-area parameter according to the first left image data and the first right image data, calculating a second estimated pressed-area parameter according to the second left image data and the second right image data, and comparing the first estimated pressed-area parameter with the second estimated pressed-area parameter for performing one of the following mechanisms:
if the second estimated pressed-area parameter is greater than the first estimated pressed-area parameter, determining the user increases the touch pressure on the image screen from the first time to the second time; and
if the second estimated pressed-parameter is less than the first estimated pressed-area parameter, determining the user decreases the touch pressure on the image screen from the first time to the second time.

12. The system for estimating the tendency of pressure change on a touch panel as claimed in claim 11, wherein:
the first left image data includes a first left shaded area, and the first left shaded area includes a first left shaded area width;
the first right image data includes a first right shaded area, and the first right shaded area includes a first right shaded area width;
the first estimated pressed-area parameter is calculated by multiplying the first left shaded area width and the first right shaded area width;
the second left image data includes a second left shaded area, and the second left shaded area includes a second left shaded area width;
the second right image data includes a second right shaded area, and the second right shaded area includes a second right shaded area width; and
the second estimated pressed-area parameter is calculated by multiplying the second left shaded area width and the second right shaded area width.

13. The system for estimating the tendency of pressure change on a touch panel as claimed in claim 11, wherein the processor is further used for:
calculating a first coordinate position according to the first left image data and the first right image data;
calculating a second coordinate position according to the second left image data and the second right image data; and
comparing whether the distance between the first coordinate position and the second coordinate position is within a predetermined allowable error distance, if yes, performing mechanisms of calculating the first estimated pressed-area parameter and calculating the second estimated pressed-area parameter.

14. The system for estimating the tendency of pressure change on a touch panel as claimed in claim 11, further comprising:
a feedback device, used for generating a feedback effect according to a feedback signal generated by the processor.

* * * * *